United States Patent [19]

Inui

[11] Patent Number: 4,809,832

[45] Date of Patent: Mar. 7, 1989

[54] GEAR SYNCHRONIZER MECHANISM

[75] Inventor: Masaki Inui, Toyota, Japan

[73] Assignee: Toyota Jidosha Kabushiki Kaisha, Aichi, Japan

[21] Appl. No.: 135,063

[22] Filed: Dec. 18, 1987

[30] Foreign Application Priority Data

Dec. 18, 1986 [JP] Japan .............................. 61-302599

[51] Int. Cl.$^4$ ............................................. F16D 23/08
[52] U.S. Cl. .................................. 192/53 F; 192/53 G
[58] Field of Search .................. 192/53 R, 53 A, 53 E, 192/53 F, 53 G; 74/339

[56] References Cited

U.S. PATENT DOCUMENTS

| | | | |
|---|---|---|---|
| 2,470,208 | 5/1949 | Avila | 192/53 F |
| 2,992,714 | 7/1961 | Peras | 74/339 |
| 3,035,674 | 5/1962 | Peras | 192/53 F |

FOREIGN PATENT DOCUMENTS 51-48540 12/1976 Japan .
1314851 4/1973 United Kingdom .

Primary Examiner—Leslie A. Braun
Assistant Examiner—David A. Testardi
Attorney, Agent, or Firm—Parkhurst, Oliff & Berridge

[57] ABSTRACT

In a gear synchronizer mechanism including a gear member rotatable on a shaft and having a cylindrical hub portion, a hub member mounted on the shaft for rotation therewith, a clutch sleeve formed at its one side with an internal conical surface and at its inner periphery with internal spline teeth in continual engagement with external spline teeth of the hub member and being axially shiftable on the hub member to be engaged at its internal spline teeth with external spline teeth of the hub portion, and a synchronizer ring formed with an external conical surface for frictional engagement with the internal conical surface of the sleeve and being axially movable on the hub portion to establish synchronization between the shaft and the gear member when engaged with the sleeve, a plurality of leaf springs are disposed within a plurality of circumferentially equally spaced radial recesses defined in the hub portion and engaged with the synchornizer ring in such a manner as to restrict axial movement of the synchronizer ring by engagement therewith in shifting operation of the clutch sleeve.

3 Claims, 5 Drawing Sheets

GEAR SYNCHRONIZER MECHANISM

BACKGROUND OF THE INVENTION

1. Field of the Invention

The present invention relates to a gear synchronizer mechanism adapted for use in manually shifted power transmissions.

2. Description of the Prior Art

In Japanese Patent Publication No. 51-48540, there has been proposed a gear synchronizer mechanism of the type which comprises a gear member provided at its one side with a cylindrical hub portion and rotatable on a transmission shaft, a hub member mounted on the shaft for rotation therewith, a clutch sleeve formed at its one side with an internal conical surface and at its inner periphery with internal spline teeth in continual engagement with external spline teeth of the hub member and being axially shiftable to be engaged at its internal spline teeth with external spline teeth of the cylindrical hub portion, a synchronizer ring formed at its outer periphery with an external conical surface for frictional engagement with the internal conical surface of the clutch sleeve and being axially movable on the cylindrical hub portion to establish synchronization between the shaft and the gear member when engaged at its external conical surface with the internal conical surface of the clutch sleeve in shifting operation, and resilient means for biasing the synchronizer ring toward the clutch sleeve and for restricting axial movement of the synchronizer ring by engagement therewith in shifting operation.

In such a conventional synchronizer mechanism as described above, the synchronizer ring is formed at its inner periphery with a plurality of circumferentially equally spaced radial projections which are axially slidably disposed within corresponding radial grooves in the cylindrical hub portion of the gear member, and a radially contractible annular spring is engaged with each recessed inner end of the radial projections to bias the synchronizer ring toward the clutch sleeve and engaged with an annular groove in the inner periphery of the cylindrical hub portion to restrict axial movement of the synchronizer ring. In shifting operation of the clutch sleeve, the synchronizer ring is engaged at its external conical surface with the internal conical surface of the clutch sleeve and urged toward the gear member under the thrust pressure applied thereto from the clutch sleeve. When the thrust pressure acting on the synchronizer ring exceeds a predetermined value, synchronization between the relative rotating parts is established, and the annular spring is disengaged from the annular groove of the cylindrical hub portion. Subsequently, the annular spring is radially inwardly compressed by engagement with an internal conical surface of the cylindrical hub portion.

In such arrangement of the annular spring as described above, reliable synchronization between the relative rotating parts may not be effected if the restriction force acting on the synchronizer ring is unstable due to an error in assembly of the components or differences in tolerances of the assembled components. In the case that an annular spring of large diameter cross-section is assembled as the annular spring to stabilize the restriction force acting on the synchronizer ring, it will cause an increase of frictional resistance when compressed by engagement with the internal conical surface of the hub portion and will cause an increase of the biasing force acting on the synchronizer ring in its shifted position. As a result, the biasing force of the spring will act to cause unexpected disengagement of the synchronizer ring from the clutch sleeve, and the internal conical surface of the hub portion will be defaced by frictional engagement with the spring in a short period of time to cause undesired change of the biasing force of the spring acting on the clutch sleeve and the synchronizer ring in shifting operation. Moreover, the strength of the gear hub portion is reduced due to the radial grooves defined therein.

SUMMARY OF THE INVENTION

It is, therefore, a primary object of the present invention is to provide an improved gear synchronizer mechanism capable of establishing reliable synchronization between the relative rotating parts regardless of any error in assembly of the components or any differences in tolerances of the assembled components.

A secondary object of the present invention is to provide an improved gear synchronizer mechanism, having the above-described characteristics, wherein the synchronizer ring is more reliably retained in its shifted position to avoid unexpected disengagment from the clutch sleeve, and wherein the strength of the gear hub portion is reinforced by a component member assembled therein.

A tertiary object of the present invention is to provide an improved gear synchronizer mechanism, having the above-described characteristics, wherein the restriction force acting on the synchronizer ring is maintained in a predetermined value for a long period of time to ensure shifting operation of the clutch sleeve under a stable load.

According to the present invention, the objects are attained by providing a gear synchronizer mechanism which comprises a gear member rotatable on a transmission shaft and having a cylindrical hub portion formed thereon with external spline teeth, a hub member formed thereon with external spline teeth and being mounted on the shaft for rotation therewith, a clutch sleeve formed at one side thereof with an internal conical surface and at an inner periphery thereof with internal spline teeth in continual engagement with the external spline teeth of the hub member and being axially shiftable on the hub member to be engaged at the internal spline teeth thereof with the external spline teeth of the cylindrical hub portion, and a synchronizer ring formed with an external conical surface for frictional engagement with the internal conical surface of the clutch sleeve and being axially movable on the cylindrical hub portion to establish synchronization between the shaft and the gear member when engaged with the clutch sleeve. In the gear synchronizer mechanism, the cylindrical hub portion of the gear member has a plurality of circumferentially equally spaced radial recesses defined therein, an annular retainer is coupled with an inner circumference of the hub portion, the annular retainer being integrally formed at one side thereof with a plurality of circumferentially equally spaced axial projections which are disposed with the radial recesses of the hub portion, and a plurality of leaf springs are disposed within the radial recesses of the hub portion and retained in place by engagement with the axial projections of the annular retainer, the leaf springs being engaged with the synchronizer ring in such a manner as to restrict axial movement of the synchronizer ring by engagement therewith in shifting operation of the clutch sleeve.

BRIEF DESCRIPTION OF THE DRAWINGS

Additional objects features and advantages of the present invention will become more readily apparent from the following detailed description of a preferred embodiment thereof when considered with reference to the accompanying drawings, in which.

DESCRIPTION OF THE PREFERRED EMBODIMENTS

Figure 1:
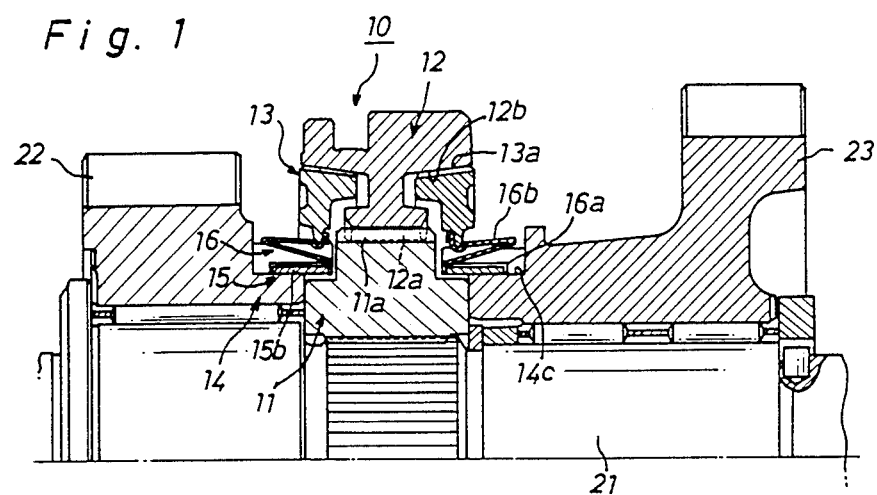
FIG. 1 illustrates in cross-sectional form one of circumferentially equally spaced parts of a gear synchronizer mechanism in accordance with the present invention, the cross-section being taken along line I—I in FIG. 3.
Figure 2:
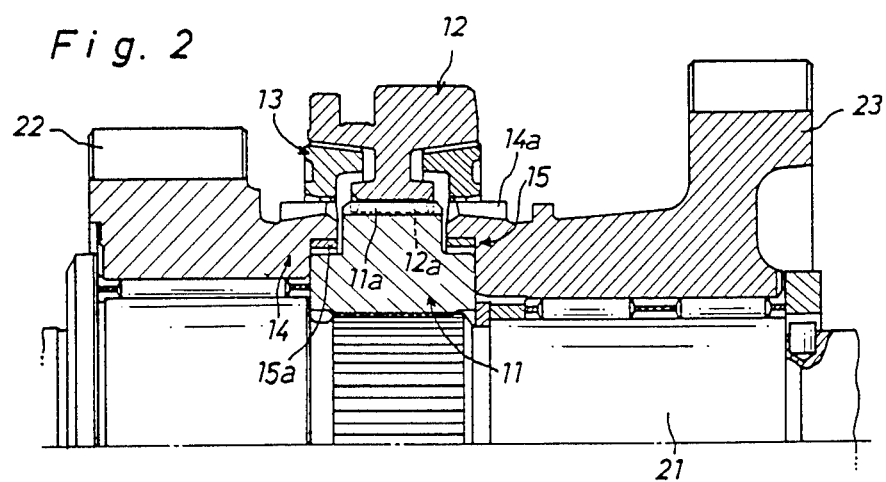
FIG. 2 illustrates in cross-sectional form one of the other circumferentially equally spaced parts of the gear synchronizer mechanism, the cross-section being taken along line II—II in FIG. 3.

Referring now to the drawings, where like reference numerals represent the same or corresponding parts throughout the figures, there is illustrated in FIG. 1 a transmission shaft 21, on which are rotatably supported a pair of change-speed gears 22 and 23. The change-speed gears 22 and 23 are arranged to be in mesh with driven gears mounted on an output shaft (not shown) in a transmission housing. Disposed between the change-speed gears 22 and 23 is a pair of synchronizer mechanisms 10 which are operable to cause selective speed synchronization between the shaft 21 and the gears 22 and 23, respectively. As is illustrated in FIGS. 1 and 2, the synchronizer mechanisms have a common hub member 11 which is formed thereon with external spline teeth 11a and fixed to the transmission shaft 21 by means of a spline connection for rotation therewith. The synchronizer mechanisms are arranged to be operated through a clutch sleeve 12 which is connected by a yoke groove to a conventional manually operated shift mechanism (not shown). The clutch sleeve 12 is arranged in surrounding relationship with the hub member 11 and has internal spline teeth 12a in continual engagement with the external spline teeth 11a of hub member 11. The clutch sleeve 12 has a sleeve portion formed at its opposite sides with a pair of internal conical surfaces 12b.

Figure 3:
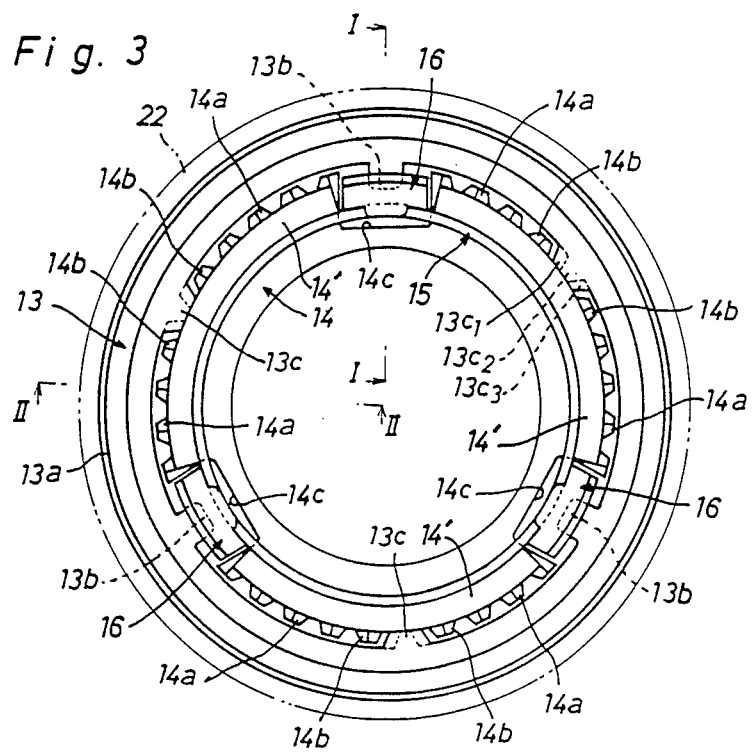
FIG. 3 is a front view of component parts shown in FIGS. 1 and 2.
Figure 4:
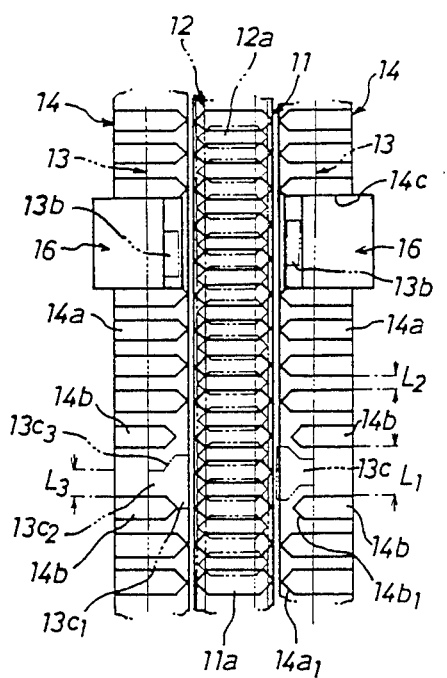
FIG. 4 illustrates the relative positions of the component parts shown in FIGS. 1 and 2.

The right-hand synchronizer mechanism is substantially the same as the left-hand synchronizer mechanism such that a detailed description of the left-hand synchronizer mechanism only is believed necessary. The left-hand synchronizer mechanism includes a synchronizer ring 13 which is axially slidably mounted on a cylindrical hub portion 14 of change-speed gear 22 through three circumferentially equally spaced leaf springs 16. The synchronizer ring 13 is formed thereon with an external conical surface 13a for frictional engagement with the internal conical surface 12b of clutch sleeve 12. As shown in FIG. 3, the synchronizer ring 13 is formed at its inner periphery with three circumferentially equally spaced first internal radial projections 13b and with three circumferentially equally spaced second internal radial projections 13c. The first radial projections 13b of synchronizer ring 13 each are supported by the leaf springs 16 in such a manner as will be described in detail later. As shown in FIG. 4, the second radial projections 13c of synchronizer ring 13 each are formed with large and small width portions $13c_1$ and $13c_2$ and chamfered at $13c_3$ between the large and small width portions $13c_1$ and $13c_2$.

As shown in FIGS. 1 to 3, the cylindrical hub portion 14 is integrally formed with the change-speed gear 22 and is formed thereon with first and second external spline teeth 14a and 14b. As shown in FIG. 4, the second external spline teeth 14b are shorter than the first external spline teeth 14a to define a space within which is disposed the large width portion $13c_1$ of internal radial projection 13c. The gear hub portion 14 has three circumferentially equally spaced radial recesses 14c defined therein, each of which receives therein a corresponding leaf spring 16, which divide into three hub sections 14'. The external spline teeth 14a and 14b are arranged on the respective hub sections 14' to be engaged with the internal spline teeth 12a of clutch sleeve 12. The second shorter external spline teeth 14b are arranged in a pair between two sets of the first longer external spline teeth 14a and spaced circumferentially in a distance $L_1$ larger than a distance $L_2$ between the respective first longer external spline teeth 14a. The distance $L_1$ between spline teeth 14b is also larger than the width $L_3$ of portion $13c_2$ of second internal radial projection 13c. The external spline teeth 14a, 14b each are chamfered at their inner ends $14a_1$ and $14b_1$. The chamfers $14b_1$ of shorter external spline teeth 14b are arranged to be engaged with the chamfers $13c_3$ of second internal radial projection 13c.

In the above arrangement, the second internal radial projections 13c of synchronizer ring 13 each are positioned between each pair of shorter external spline teeth 16b in such a manner as to permit relative rotation between the synchronizer ring 13 and the gear hub portion 14. When relative rotation of the synchronizer ring 13 and hub portion 14 is caused in shifting operation of the clutch sleeve in a leftward direction, the second internal radial projections 13c of ring 13 are engaged at their chamfers $13c_3$ with the chamfers $16b_1$ of shorter external spline teeth 16b, as shown by imaginary lines in FIG. 4.

Figure 5:
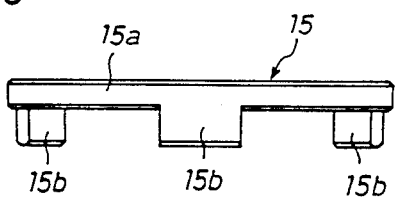
FIG. 5 is a plan view of an annular retainer shown in FIG. 3.
Figure 6:
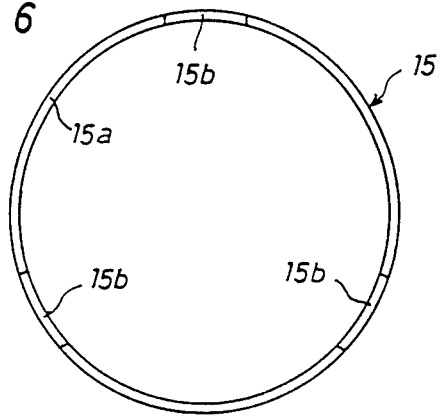
FIG. 6 is a front view of the annular retainer.
Figure 7:
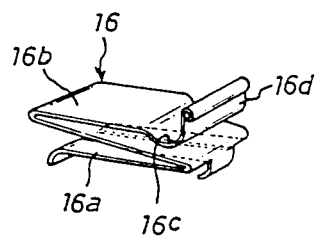
FIG. 7 is a perspective view of a leaf spring shown in FIGS. 1 and 3.

As shown in FIGS. 1 to 3, an annular retainer 15 is fixedly coupled with an inner stepped circumference of gear hub portion 14 for reinforcement of the same. As shown in FIGS. 5 and 6, the annular retainer 15 has an annular body portion 15a which is integrally formed at one side thereof with circumferentially equally spaced axial projections 15b. In a condition where the annular retainer 15 is coupled at its body portion 15a with the inner stepped circumference of gear hub portion 14, the axial projections 15b of retainer 15 are disposed within the radial recesses 14c of gear hub portion 14 to receive thereon the leaf springs 16. As shown in FIG. 7, the leaf springs 16 each are made of spring steel and formed with a pair of parallel leg portions 16a and a support arm 16b. The support arm 16b has a curved portion 16c and a flared end 16d.

Figure 8:
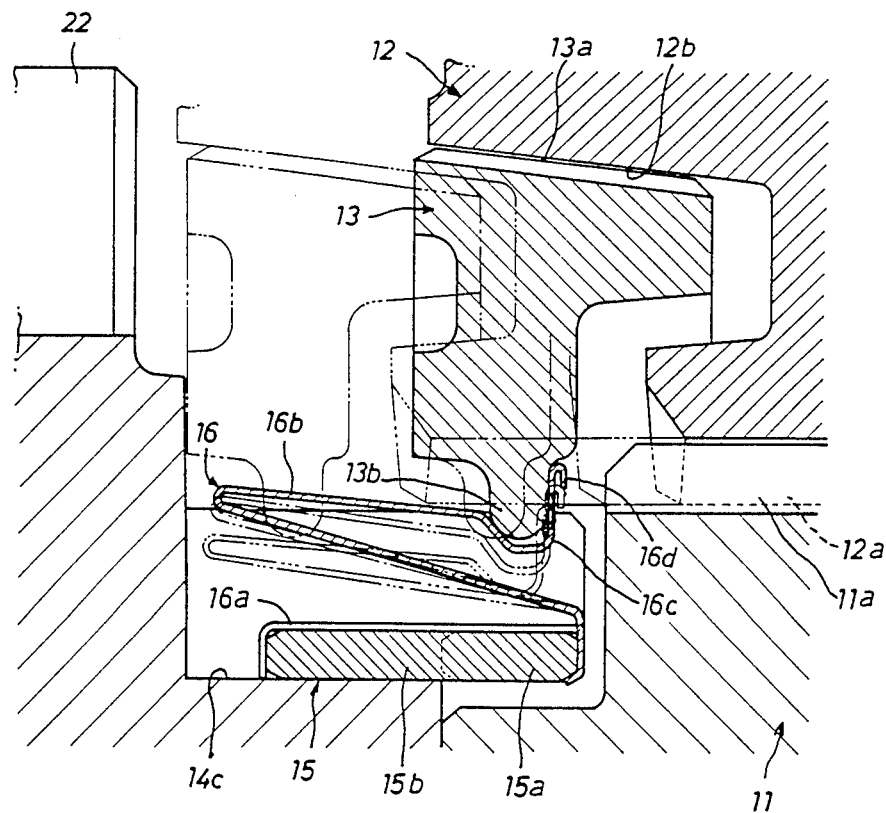
FIG. 8 is an enlarged sectional view illustrating action of the leaf spring in shifting operation.

As clearly shown in FIG. 8, the parallel leg portions 16a of leaf spring 16 are disposed within the corresponding radial recess 14c of gear hub portion 14 and retained in place by engagement with the corresponding axial projection 15b of annular retainer 15 in such a manner that the internal radial projection 13b of synchronizer ring 13 is received by the curved portion 16c of support arm 16b. In this manner, the leaf springs 16 are assembled within the radial recesses 14c of gear hub portion 14 to resiliently support thereon the internal radial projections 13b of synchronizer ring 13 and to restrict axial movement of the synchronizer ring 13 by engagement therewith. In such arrangement of the leaf springs 16, the flared end 16d of support arm 16b is positioned to be moved radially inwardly by engagement with the internal spline teeth 12a of clutch sleeve 12 in shifting operation.

Assuming that the clutch sleeve 12 is retained in a neutral position as shown in FIGS. 1 and 2, it will freely rotate with the hub member 11 on transmission shaft 12. When the clutch sleeve 12 is shifted leftwards from the neutral position, the synchronizer ring 13 is frictionally engaged at its external conical surface 13a with the left-hand internal conical surface 12b of clutch sleeve 12 to rotate with the clutch sleeve 12 and is urged toward the change-speed gear 22 against a restriction force caused by engagement with the leaf springs 16. This causes relative rotation between the synchronizer ring 13 and the gear hub portion 14 and causes the second internal radial projections 13c of ring 13 to engage the shorter external spline teeth 14b of hub portion 14. (see FIG. 4) As a result, the axial movement of clutch sleeve 12 is resisted by the balk action or engagement between the chamfers $13c_3$ of internal radial projections 13c and the chamfers $14b_1$ of shorter external spline teeth 14b to establish synchronization between the clutch sleeve 12 and the gear 22.

Figure 9:
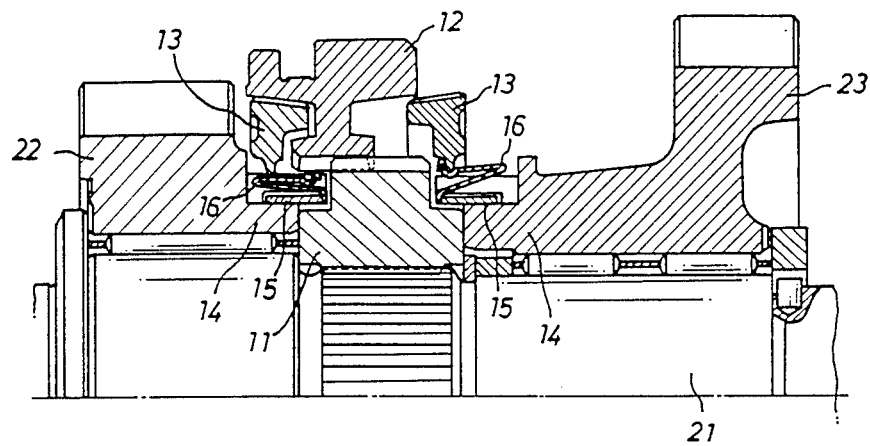
FIGS. 9 and 10 each illustrate a shifted condition of a clutch sleeve shown in FIGS. 1 and 2, respectively.
Figure 10:
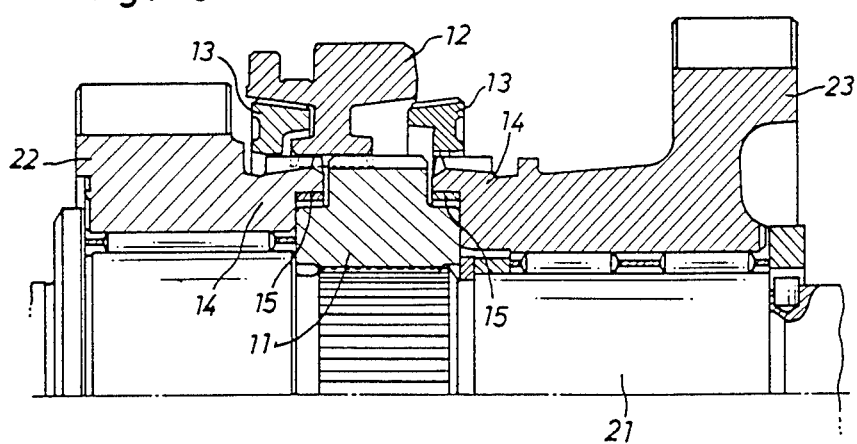

Subsequently, the first internal radial projections 13b of ring 13 are disengaged from the curved portions 16c of support arms 16b against the biasing force of leaf springs 16 and ride over the support arms 16b of leaf springs 16 thereby compressing them radially inwardly. This permits the second internal radial projections 13c of ring 13 to pass through axial grooves respectively formed between the shorter external spline teeth 14b of gear hub portion 14. Thus, as shown in FIGS. 9 and 10, the internal spline teeth 12a of clutch sleeve 12 are smoothly brought into engagement with the first external spline teeth 14a of gear hub portion 14 to accomplish drive connection between the transmission shaft 21 and the change-speed gear 22. After engagement of the clutch sleeve 12 with the gear hub portion 14, the leaf springs 16 are radially inwardly compressed by engagement with the internal spline teeth 12a of clutch sleeve 12 and disengaged from the synchronizer ring 13 to avoid unexpected disengagement of the synchronizer 13 from the gear hub portion 14.

When the clutch sleeve 12 is shifted from the left-hand shifted position toward the neutral position to disconnect the change-speed gear 22 from the transmission shaft 21, the internal spline teeth 12a of clutch sleeve 12 are disengaged from the external spline teeth 14a, 14b of hub portion 14 to release the compression of leaf springs 16. As a result, the synchronizer ring 13 is engaged with the leaf springs 16 at its internal radial projections 13b and urged rightwards under the biasing force of leaf springs 16. Thus, the synchronizer ring 13 is returned to the neutral position and retained in place by engagement with the flared ends 16d of leaf springs 16, as shown in FIGS. 1 and 2.

As will be understood from the above description, the synchronizer mechanism 10 is characterized in that the leaf springs 16 are maintained in engagement with the internal radial projections 13b of synchronizer ring 13 to retain the synchronizer ring 13 in the neutral position and to restrict axial movement of the synchronizer ring 13 when the clutch sleeve 12 is shifted leftwards and that the leaf springs 16 are compressed radially inwardly to permit axial movement of the synchronizer ring 13 and disengaged from the synchronizer ring 13. With this arrangement, the leaf springs 16 act to more reliably retain the synchronizer ring 13 in the neutral position and to ensure reliable synchronization between the transmission shaft 21 and the change-speed gear 22 regardless of any error in assembly of the components or any differences in tolerances of the assembled components, and the biasing forces of leaf springs 16 are maintained in a predetermined value for a long period of time to ensure shifting operation of the clutch sleeve 12 under a predetermined load. Furthermore, the annular retainer 15 is useful to ensure sufficient strength of the gear hub portion 14 regardless of the provision of radial recesses 14c.

Having now fully set forth both structure and operation of various preferred embodiments of the concept underlying the present invention, other embodiments as well as certain variations and modifications the embodiments herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. A gear synchronizer mechanism comprising a gear member rotatable on a transmission shaft and having a cylindrical hub portion formed thereon with external spline teeth, a hub member formed thereon with external spline teeth and being mounted on said shaft for rotation therewith, a clutch sleeve formed at one side thereof with an internal conical surface and at an inner periphery thereof with internal spline teeth in continual engagement with the external spline teeth of said hub member and being axially shiftable on said hub member to be engaged at the internal spline teeth thereof with the external spline teeth of said cylindrical hub portion, and a synchronizer ring formed with an external conical surface for frictional engagement with the internal conical surface of said clutch sleeve and being axially movable on said cylindrical hub portion to establish synchronization between said shaft and said gear member when engaged with said clutch sleeve, wherein said cylindrical hub portion of said gear member has a plurality of circumferentially spaced radial recesses defined therein, wherein an annular retainer is coupled with an inner circumference of said hub portion, said annular retainer being integrally formed at one side thereof with a plurality of circumferentially spaced axial projections which are disposed within the radial recesses of said hub portion, and wherein a plurality of leaf springs are disposed within the radial recesses of said hub portion and retained in place by engagement with the axial projections of said annular retainer, said leaf springs being engaged with said synchronizer ring in such a manner as to restrict axial movement of said synchronizer ring by engagement therewith in shifting operation of said clutch sleeve.

2. A gear synchronizer mechanism as claimed in claim 1, wherein said synchronizer ring is formed at an inner periphery thereof with a plurality of circumferentially spaced internal radial projections, and wherein said leaf springs each are formed with a leg portion and a support arm, said leg portion being retained in place by engagement with the respective axial projections of said annular retainer, and said support arm having a curved portion for engagement with the respective internal radial projections of said synchronizer ring.

3. A gear synchronizer mechanism as claimed in claim 2, wherein said support arm of said leaf spring is formed with a radially outwardly flared end to be moved radially inwardly by engagement with the internal spline teeth of said clutch sleeve.

* * * * *